United States Patent [19]

Crouch et al.

[11] 4,057,510

[45] Nov. 8, 1977

[54] PRODUCTION OF NITROGEN RICH GAS MIXTURES

[75] Inventors: William B. Crouch, Whittier; Carolina P. Fabiero, Roland Heights; Allen M. Robin, Anaheim, all of Calif.

[73] Assignee: Texaco Inc., New York, N.Y.

[21] Appl. No.: 617,601

[22] Filed: Sept. 29, 1975

[51] Int. Cl.$^2$ .................... C01B 2/00; C01B 2/14
[52] U.S. Cl. ........................ 252/372; 252/375; 252/376
[58] Field of Search ............... 252/372, 373, 375, 376

[56] References Cited

U.S. PATENT DOCUMENTS

| | | | |
|---|---|---|---|
| 3,097,081 | 7/1963 | Eastman et al. | 252/373 X |
| 3,232,885 | 2/1966 | Henke | 252/372 |
| 3,285,711 | 11/1966 | Stanford | 252/372 |
| 3,919,114 | 11/1975 | Reynolds | 252/373 |
| 3,920,579 | 11/1975 | Slater | 252/372 X |
| 3,920,717 | 11/1975 | Marion | 252/373 |
| 3,927,997 | 12/1975 | Child et al. | 252/373 |
| 3,945,942 | 3/1976 | Marion et al. | 252/373 |
| 3,951,617 | 4/1976 | Crouch | 252/373 X |

FOREIGN PATENT DOCUMENTS

| | | | |
|---|---|---|---|
| 933,071 | 8/1963 | United Kingdom | 252/372 |
| 913,148 | 12/1962 | United Kingdom | 252/372 |

OTHER PUBLICATIONS

Hougen et al., Chemical Process Principles Part 3, Kinetics & Catalysis, J. Wiley & Sons, New York (1947), pp. 1031-1033.

*Primary Examiner*—Howard T. Mars
*Attorney, Agent, or Firm*—Thomas H. Whaley; Carl G. Ries; Albert Brent

[57] ABSTRACT

A nitrogen-rich inert gas mixture is produced by the partial oxidation of a hydrocarbonaceous feed containing substantially no metals nor noncombustible materials with air in a free-flow, unpacked, refractory-lined gas generator at a temperature in the range of about 1300° to 3000° F. and a pressure in the range of about 1 to 250 atmospheres. The product gas will comprise a mixture of nitrogen, argon and carbon dioxide and may contain small amounts of hydrogen and carbon monoxide, depending on the O/C atomic ratio selected. The atomic ratio of free oxygen in said air to carbon in said hydrocarbonaceous fuel is in the range of about 1.7 to stoichiometric, or slightly less than stoichiometric. By operating at this level of O/C atomic ratio, the $H_2$ + CO content of the product gas may be minimized or deleted, substantially all of the particulate carbon may be oxidized, substantially no $NO_x$ is produced, and the product gas contains substantially no free oxygen. Further, the sensible heat recovered from the product gas may be used to manufacture by-product high pressure steam for export. The nitrogen-rich product gas may be used for oil formation flooding, or as a pressurizing or blanketing gas. Costly gas compressors may be avoided since the product gas may be produced at or above use pressure.

9 Claims, No Drawings

PRODUCTION OF NITROGEN RICH GAS MIXTURES

BACKGROUND OF THE INVENTION

1. Field of the Invention

This invention relates to a continuous process for the manufacture of a nitrogen-rich gas stream by the partial oxidation of a hydrocarbonaceous feed with air. More specifically, the present invention pertains to the production of a mixture of inert gases substantially comprising $N_2$, A and $CO_2$.

2. Description of the Prior Art

Hydrocarbonaceous feedstocks, e.g. petroleum oil, have been reacted previously with a free oxygen-containing gas in the presence of steam to produce gaseous mixtures principally comprising $H_2$ and CO. For example, see coassigned U.S. Pat. No. 3,097,081 — Du Bois Eastman et al. The free oxygen-containing gas is usually substantially pure oxygen, e.g. 95 mole % $O_2$ or more, in order to reduce the amount of nitrogen in the product gas.

SUMMARY

The subject process relates to the production of a continuous stream of nitrogen-rich gases by the partial oxidation of a hydrocarbonaceous feed with air. A stream of inert gas substantially comprising nitrogen, argon and carbon dioxide may be produced. The product gas contains substantially no gaseous nitrogen oxide compounds, no particulate carbon, and no free oxygen gas. In the process, a hydrocarbonaceous feedstock containing substantially no metals nor noncombustible materials is reacted with air by partial oxidation. The atomic ratio of free oxygen in said air to carbon in said hydrocarbonaceous fuel is in the range of about 1.7 to stoichiometric, or preferably 0.2 less than stoichiometric. The weight ratio of air to hydrocarbonaceous fuel may be in the range of about 7 to 22. The reaction takes place in a free-flow, unpacked, refractory-lined gas generator, free from catalyst, at a temperature in the range of about 1300° to 3000° F. and a pressure in the range of about 1 to 250 atmospheres. Optionally, by further processing, including drying and conventional gas purification techniques, various mixtures of inert gases comprising nitrogen, carbon dioxide and argon may be obtained.

DESCRIPTION OF THE INVENTION

In the subject continuous process a hydrocarbonaceous feed is reacted by partial oxidation with air under conditions producing a nitrogen-rich gas stream containing up to about 80 to 90 mole % (dry basis) of elemental nitrogen gas, and higher. Since the atmosphere in the reaction zone is slightly reducing, the nitrogen-rich gas produced contains substantially no oxides of nitrogen, i.e. less than 10 parts per million (ppm) of the oxides of nitrogen ($NO_x$ where $x$ is a number in the range of ½ to 2½). Further, there is substantially no free oxygen nor particulate carbon in the effluent gas from the generator.

The nitrogen-rich product gas may be used to blanket or pressurize vessels containing materials that become hazardous or corrosive in the presence of air, or it may be used to pressurize an oil well for secondary recovery of oil. Since the inert gas produced will contain substantially no $NO_x$, the gas is noncorrosive to the steel casings used in oil wells or to steel vessels. Further, if the inert product gas is used for oil well injection, it may be injected hot without condensing the steam. Thus, the volume of gas available for injecting is increased and the oil in the formation may be heated up at the same time.

The generator for carrying out the partial oxidation reaction in the subject process preferably consists of a compact, unpacked, free-flow, noncatalytic, refractory-lines steel pressure vessel of the type described in coassigned U.S. Pat. No. 2,809,104 issued to D. M. Strasser et al, which patent is incorporated herewith by reference. The nitrogen-rich effluent gas stream from the gas generator may have the following composition in mole % (wet basis): $N_2$ 53 to 74; $CO_2$ 4 to 13; A 0.65 to 0.95; $H_2$ nil to 20; CO nil to 15; $H_2O$ 8 to 19; COS nil to 0.05; $H_2S$ nil to 0.3; $NO_x$ less than 10 ppm; and particulate carbon less than 100 ppm.

Optionally, by conventional gas drying and purification techniques, inert gas mixtures of different compositions may be derived from the effluent stream from the gas generator comprising $N_2$, A and $CO_2$. For example, inert gas compositions (1) and (2) below in mole % may be obtained: (1) $N_2$ 84 to 92, $CO_2$ 7 to 15, and A 0.9 to 1.1; and (2) $N_2$ 98.8 to 98.9, and A 1.1 to 1.2.

A wide variety of hydrocarbonaceous fuels containing substantially no metals nor noncombustible materials are suitable as feedstocks for the partial oxidation process, either alone or in combination with each other. The hydrocarbonaceous feed may be gaseous, liquid or solid. The hydrocarbonaceous feeds include fossil fuels such as: various liquid hydrocarbon fuels including petroleum distillates, liquefied petroleum gas, naphtha, kerosine, gasoline, gas oil, fuel oil, coal oil, shale oil, tar sand oil, aromatic hydrocarbons such as benzene, toluene, xylene fractions, coal tar, furfural extract of coker gas oil, and mixtures thereof. Suitable liquid hydrocarbon fuel feeds as used herein are by definition liquid hydrocarbonaceous fuel feeds that have a gravity in degrees API in the range of about −20 to 100.

Included also by definition as a hydrocarbonaceous fuel are liquid oxygenated hydrocarbonaceous materials, i.e. liquid hydrocarbon materials containing combined oxygen, including alcohols, ketones, aldehydes, organic acids, esters, ethers, oxygenated fuel oil and mixtures thereof. Further, a liquid oxygenated hydrocarbonaceous material may be in admixture with one of said liquid petroleum materials.

Included also are pumpable slurries of solid hydrocarbonaceous fuels, e.g. particulate carbon and other ash-free carbon-containing solids in a liquid hydrocarbon fuel and mixtures thereof. By definition, gaseous hydrocarbonaceous fuels include natural gas, methane, ethane, propane, butane, pentane, water gas, coke-oven gas, refinery gas, acetylene tail gas, ethylene off-gas, and mixtures thereof. Both gaseous and liquid fuels may be mixed and used simultaneously and may include paraffinic, olefinic, naphthenic and aromatic compounds.

In conventional partial oxidation procedures, it is normal to produce from ordinary hydrocarbonaceous fuel feeds about 0.2 to 20 weight percent of free carbon soot (on the basis of carbon in the hydrocarbonaceous fuel feed). The free carbon soot is produced in the reaction zone of the gas generator, for example, by cracking hydrocarbonaceous fuel feeds. Carbon soot will prevent damage to the refractory lining in the generator by constituents which are present as ash components in some residual oils. In conventional synthesis gas generation processes with heavy crude or fuel oil feeds, it is preferable to leave about 1 to 3 weight percent of the carbon in the feed as free carbon soot in the product gas. With lighter distillate oils, progressively lower carbon soot yields are maintained. However, since the hydrocarbonaceous fuel feeds in the subject process are specified as being free from metals and ash-free, e.g. no noncombustible solids, carbon soot is not required in the reaction zone to protect the refractory lining and substantially all of the particulate carbon produced may be converted into carbon oxides.

Particulate carbon and the oxides of nitrogen may be eliminated from the subject process gas stream primarily by regulating the oxygen to carbon ratio (O/C, atoms of oxygen in oxidant per atom of carbon in hydrocarbonaceous feed) in the range of about 1.7 to stoichiometric and preferably 0.2 less than stoichiometric, wherein by definition the term "stoichiometric" means the stoichiometric number of atoms of oxygen theoretically required to completely react with each mole of hydrocarbonaceous feedstock to produce carbon dioxide and water.

Thus, the (O/C, atom/atom) ratio may be in the range of about 1.7 to 4.0 and preferably 2.0 to 3.8 for gaseous hydrocarbonaceous fuels; and in the range of about 1.7 to 3.0 and preferably 2.0 to 2.8 for liquid hydrocarbonaceous fuels. When the O/C atomic ratio reaches stoichiometric, the moles of $H_2$ and CO in the product gas theoretically drop to zero. The weight ratio of air to hydrocarbonaceous fuel may be in the range of about 7 to 22. In the above relationship, the O/C ratio is to be based upon the total of free oxygen atoms in the oxidant stream plus combined oxygen atoms in the hydrocarbonaceous fuel feed molecules.

In order to operate the subject generator over the entire O/C range, i.e. about 1.7 to 4.0, additional cooling may have to be provided in some cases to keep the reaction temperature from exceeding 3000° F. In the subject process, the nitrogen in the air reactant is sufficient to act as the temperature moderator and will prevent the reaction zone temperature from exceeding 3000° F. when the O/C atomic ratio is 3 and below for a gaseous hydrocarbonaceous fuel, or when the O/C atomic ratio is 2 and below for a liquid hydrocarbonaceous fuel. In such instance, for example, no supplemental $H_2O$ other than that normally found in the reactant streams need be introduced into the reaction zone as a temperature moderator since the nitrogen in the air is an adequate temperature moderator.

However, when the O/C atomic ratios exceed these specified ranges, then some form of additional cooling may be used. Thus, in the subject process, the reaction temperature may be maintained at a maximum of 3000° F. when the hydrocarbonaceous fuel is in the gaseous phase and the O/C atomic ratio is above 3.0 to 4.0 or when said hydrocarbonaceous fuel is in the liquid phase and the O/C atomic ratio is above 2.0 to 3.0 by recycling a cooled portion of the effluent inert gas stream to the reaction zone. For example, sufficient effluent gas from the reaction zone may be cooled to a temperature in the range of about 80 to 300° F. by external heat exchange and then recycled to the gas generator to maintain the reaction zone at a maximum temperature of 3000° F. Alternatively, cooling of the gas in the reaction zone may be effected by installing water-cooled coils in the gas generator, or by simultaneously introducing a small amount of supplemental $H_2O$ from an external source into the reaction zone along with said reactants in the amount of about 0.05 to 1.0 and preferably less than 0.15 parts by weight of $H_2O$ per part by weight of fuel.

The hot effluent gas stream from the reaction zone of the synthesis gas generator may be cooled to a temperature in the range of about 80° to 900° F. by indirect heat exchange in a waste heat boiler. This nitrogen-rich gas stream may be used as an inert gas mixture or may be dried and purified by conventional procedures to separate any or all of the unwanted constituents.

Thus, by conventional means substantially all of the $H_2O$ may be removed from the process gas stream. For example, the clean process gas stream may be cooled to a temperature below the dew point of water by conventional means to condense out and separate $H_2O$. Next, the feed stream may be substantially dehydrated by contact with a desiccant such as alumina.

In other embodiments, by conventional gas purification methods including, for example, cryogenic cooling and solvent absorption, $H_2$, CO and acid gas ($CO_2$, $H_2S$ and COS) may be removed; or alternately, only the sulfur-containing gases (if present) and not the $CO_2$ may be separated from the effluent gas from the gas generator. For example, the dry process gas stream may be cooled to a temperature near the triple point in the range of about $-70°$ to $-50°$ F. to condense out and separate a liquid stream comprising from about 0 to 70 volume percent of the $CO_2$, $H_2S$ and COS originally present (depending upon the pressure and the amount present in the raw gas). Further purification of the process gas stream may be effected by any suitable conventional system employing physical absorption with a liquid solvent, e.g. cold methanol, N-methyl-pyrrolidone. A simplified system in which removal of the remaining $H_2S$, COS, $CO_2$ and $H_2O$ may be accomplished by physical absorption in cold methanol will be described below.

In a conventional liquid-gas absorption column, e.g. tray-type, at a temperature in the range of about $-20°$ to $-70°$ F. and a pressure in the range of about 25 to 150 atmospheres, about 10 to 20 standard cubic feed (SCF) of the partially purified process gas stream are contacted by each pound of cold methanol. Preferably, the pressure in the absorption column is the same as the pressure in the gas generator less ordinary drop in the lines and equipment. The solvent rate is inversely proportional to the pressure and to the solubility. Solubility is a function of temperature and the compositions of the solvent and of the gas mixture. Acid gases are highly soluble in methanol at high pressures and low temperatures. Then, when the pressure is reduced, these gases may be readily stripped from the solvent without the costly steam requirement of conventional chemical-absorption methods.

The difference in solubility between $CO_2$ and the gaseous sulfur compounds in methanol and in most polar solvents makes it possible to selectively remove $H_2S$ and COS before $CO_2$ removal. Further, the $H_2S$ and COS may be concentrated into a fraction suitable for feeding a conventional Claus unit where elemental sulfur is produced.

The process gas stream leaving the gas purification zone may have the following composition in mole %: $N_2$ 61 to 99; A 0.75 to 1.21; $H_2$ nil to 23; CO nil to 17; and $CH_4$ nil to 1.3; $CO_2$ nil to 2000 ppm; $H_2S$ nil to 10 ppm; and COS nil to 10 ppm. This gas stream may be used as an inert blanket gas in a carburizing process or reforming furnace.

The liquid solvent absorbent leaving the gas purification zone charged with acid gas may be regenerated by suitable conventional techniques, including flashing, stripping, boiling and combinations thereof, to produce a $CO_2$-rich gas stream and a separate stream of sulfur-containing gases. This $H_2S$-rich gas stream may be introduced into a conventional Claus unit for the production of byproduct sulfur.

Optionally, the process gas stream leaving the acid gas absorption zone may be purified to remove the other noninert impurities. A CO-rich gas stream and a separate $H_2$-rich gas stream substantially comprising 98 to 99 mole % hydrogen may be obtained thereby. Any suitable conventional system employing physical absorption with a liquid solvent may be employed for obtaining the CO-rich gas stream from the effluent gas stream leaving the acid gas absorption column. The CO-rich gas stream comprises 98 mole % CO and 2 mole % $CO_2$. For example, the effluent gas stream from the acid gas scrubber may be contacted in a conventional packed or tray-type column with a countercurrent stream of cuprous acetate dissolved in aquaammonia solution.

In another embodiment, the effluent gas from the generator may be burned in a second stage with a controlled amount of air and optionally with a combustion catalyst to convert all of the $H_2$ and CO into $H_2O$ and $CO_2$ without producing soot, $NO_x$ or free oxygen in the process gas stream. The $H_2O$ and optionally $CO_2$, $H_2S$ and COS may be then removed from the process gas stream in the gas purification zone in the manner previously described.

The following example is offered as a better understanding of the present invention, but the invention is not to be construed as unnecessarily limited thereto.

EXAMPLE I

The process fuel oil in this example has a gravity of 17.7° API, a gross heating value of 18,650 BTU/pound, and the following analysis in weight percent: C 86.5; H 11.2; O 0.0; N 0.5; S 1.8; ash nil; and metals nil. 357 pounds per hour of said process fuel oil at a temperature of about 60° F. are charged into the reaction zone of a free-flow, unpacked, noncatalytic, refractorylined gas generator by way of the annulus passage of a conventional annulus-type burner. Simultaneously, 39,559 standard cubic feet per hour of dry air at a temperature of about 63° F. are passed into the reaction zone by way of the center passage of said burner so as to atomize said fuel oil feed at the tip of the burner. The resulting mixture of oil and air is reacted at an autogenous temperature of about 2700° F. and at a pressure of 21 atmospheres.

44,289 standard cubic feet per hour of an inert effluent gas stream are discharged from the reaction zone having the following analysis in mole % (dry basis): $N_2$ 69.8; $CO_2$ 5.8; A 0.9; $H_2$ 7.2; CO 16.2; $CH_4$ nil; $H_2S$ 0.2; COS 0.01; and $NO_x$ less than 0.5 ppm. This inert gas stream may be used for oil formation flooding or as a blanketing gas when small amounts of CO and $H_2$ are not objectionable.

Optionally, all of the $H_2$, CO, $CH_4$, $H_2S$, COS and $H_2O$ may be removed by conventional gas purification techniques to produce an inert gas mixture comprising in mole %: $N_2$ 91.2; $CO_2$ 7.6; and A 1.2. This inert gas stream may be used as a pressurizing gas or as a blanketing gas.

The process of the invention has been described generally and by example with reference to an oil feedstock of particular composition for purposes of clarity and illustration only. It will be apparent to those skilled in the art from the foregoing that various modifications of the process and the materials disclosed herein can be made without departure from the spirit of the invention.

We claim:

1. In the partial oxidation of a hydrocarbonaceous feedstock selected from the group consisting of hydrocarbonaceous fuel, liquid oxygenated hydrocarbonaceous material, and mixtures thereof with air and optionally in the presence of a supplemental temperature moderator in the reaction zone of a free-flow, noncatalytic, unpacked, refractory lined gas generator at a pressure in the range of about 1 to 250 atmospheres and a temperature in the range of about 1300° to 3000° F to produce an effluent gas mixture comprising $H_2$, CO, $H_2O$, $CO_2$, $H_2S$, COS, $N_2$ and A, the improvement comprising: reacting said hydrocarbonaceous feedstock containing no metals nor noncombustible materials with air and supplemental $H_2O$ in the range of nil to 1.0 pounds of $H_2O$ per pound of fuel, and wherein the O/C atomic ratio is in the range of 2 to 3.8 when said hydrocarbonaceous feedstock is a gaseous hydrocarbonaceous fuel, and in the range of about 2 to 2.8 when said hydrocarbonaceous feedstock is a liquid hydrocarbonaceous fuel or liquid oxygenated hydrocarbonaceous material; producing an effluent gas mixture substantially comprising $N_2$, A, and $CO_2$, and containing at least one gas from the group $H_2$, CO, $H_2O$, COS and $H_2S$, and being free-from particulate carbon, free-oxygen and nitrogen oxides; and removing at least one gas from the group $CO_2$, $H_2O$, COS, $H_2S$, $H_2$, and CO in a gas drying and purification zone to produce a nitrogen-rich gas mixture.

2. The process of claim 1 provided with the additional step of recycling a cooled portion of said nitrogen-rich gas mixture to said reaction zone as a portion of said temperature moderator.

3. The process of claim 1 wherein said hydrocarbonaceous fuel is a liquid hydrocarbon selected from the group consisting of liquefied petroleum gas, petroleum distillates, gasoline, naphtha, kerosine, fuel oil, tar sand oil, shale oil, coal oil, aromatic hydrocarbons such as benzene, toluene, xylene fractions, coal tar, furfural extract of coker gas oil, and mixtures thereof.

4. The process of claim 1 wherein said hydrocarbonaceous fuel is a gaseous hydrocarbonaceous fuel selected from the group consisting of methane, ethane, propane, butane, pentane, natural gas, water gas, coke-oven gas, refinery gas, acetylene tail gas, ethylene off-gas, and mixtures thereof.

5. The process of claim 1 wherein said hydrocarbonaceous fuel is an oxygenated hydrocarbonaceous organic material selected from the group consisting of aldehydes, organic acids, alcohols, esters, ethers, ketones, oxygenated fuel oil, and mixtures thereof.

6. The process of claim 1 wherein said hydrocarbonaceous fuel is a pumpable slurry of solid carbonaceous fuels selected from the group consisting of particulate carbon and other ash-free carbon-containing solids in a liquid hydrocarbon fuel, and mixtures thereof.

7. The process of claim 1 provided with the additional step of passing cooling water through a pipe coil situated in said reaction zone to help maintain said reaction temperature.

8. The process of claim 1 wherein said nitrogen-rich product gas mixture comprises in mole % $N_2$ 84 to 92, $CO_2$ 7 to 15, and A 0.9 to 1.1.

9. The process of claim 1 wherein said nitrogen-rich product gas mixture comprises in mole %: $N_2$ 98.8 to 98.9 and A 1.1 to 1.2.

* * * * *